(12) United States Patent
Sauer et al.

(10) Patent No.: US 10,345,054 B2
(45) Date of Patent: Jul. 9, 2019

(54) THERMAL BRIDGE ELEMENT AND METHOD FOR THE PRODUCTION THEROF

(71) Applicant: Airbus DS GmbH, Taufkirchen (DE)

(72) Inventors: Arne Sauer, Markdorf (DE); Fabian Preller, Braunschweig (DE)

(73) Assignee: AIRBUS DS GMBH, Taufkirchen (DE)

( * ) Notice: Subject to any disclaimer, the term of this patent is extended or adjusted under 35 U.S.C. 154(b) by 258 days.

(21) Appl. No.: 14/606,081

(22) Filed: Jan. 27, 2015

(65) Prior Publication Data

US 2015/0211815 A1 Jul. 30, 2015

(30) Foreign Application Priority Data

Jan. 28, 2014 (DE) .......................... 10 2014 000 908

(51) Int. Cl.
*F28F 21/02* (2006.01)
*B32B 9/00* (2006.01)
(Continued)

(52) U.S. Cl.
CPC .............. *F28F 21/02* (2013.01); *B23P 15/26* (2013.01); *B32B 3/06* (2013.01); *B32B 3/08* (2013.01); *B32B 9/007* (2013.01); *B32B 15/20* (2013.01); *B32B 27/08* (2013.01); *B32B 27/18* (2013.01); *F28F 21/065* (2013.01); *B32B 2255/205* (2013.01); *B32B 2262/106* (2013.01); *B32B 2307/302* (2013.01); *B32B 2307/718* (2013.01);
(Continued)

(58) Field of Classification Search
CPC ......... H05K 1/0203; H05K 2201/0323; H05K 7/205; F28F 21/02; F28F 21/065; B32B 5/08; B32B 15/14; Y10S 165/905; H01R 39/24; H01L 23/373; H01L 23/3733; C08J 5/042
USPC ........................................................ 165/185
See application file for complete search history.

(56) References Cited

U.S. PATENT DOCUMENTS

| 4,849,858 | A | * | 7/1989 | Grapes | ................. | H05K 1/0203 |
| | | | | | | 165/185 |
| 5,390,734 | A | * | 2/1995 | Voorhes | .................. | F28F 13/00 |
| | | | | | | 165/185 |

(Continued)

FOREIGN PATENT DOCUMENTS

JP 2001-110952 A 4/2001

OTHER PUBLICATIONS

European Search Report dated Jun. 11, 2015 (six pages).

*Primary Examiner* — Tho V Duong
(74) *Attorney, Agent, or Firm* — Crowell & Moring LLP

(57) ABSTRACT

A flexible, thermal bridge element, particularly for a space flight instrument, a satellite, a transportation device, or a machine component, includes a number of carbon fiber-reinforced plastic (CFK) layers stacked on top of one another. Each of the CFK layers is composed of a plurality of heat-conductive carbon fibers embedded in a matrix. In at least two segments, particularly opposing end segments, the CFK layers are freed of the material of the matrix so that the carbon fibers of a respective CFK layer are exposed in the at least two segments. The exposed segments of the carbon fibers are provided with an associated metallization, by way of which within the framework of a thermally assisted joining process, the bridge element is connected to a thermally conductive connector element.

9 Claims, 3 Drawing Sheets

(51) Int. Cl.
*B32B 15/20* (2006.01)
*B32B 27/08* (2006.01)
*B32B 27/18* (2006.01)
*B32B 3/06* (2006.01)
*B32B 3/08* (2006.01)
*B23P 15/26* (2006.01)
*F28F 21/06* (2006.01)

(52) U.S. Cl.
CPC ....... *B32B 2605/18* (2013.01); *Y10T 29/4935* (2015.01)

(56) References Cited

U.S. PATENT DOCUMENTS

| | | | | |
|---|---|---|---|---|
| 5,769,158 | A * | 6/1998 | Yao | F28F 13/00 |
| | | | | 165/185 |
| 5,949,650 | A * | 9/1999 | Bulante | H05K 1/056 |
| | | | | 165/185 |
| 6,060,166 | A * | 5/2000 | Hoover | B29C 70/546 |
| | | | | 165/82 |
| 6,246,012 | B1 * | 6/2001 | Wallace | H01R 12/58 |
| | | | | 174/117 F |
| 7,220,131 | B1 * | 5/2007 | Pecht | H01L 24/10 |
| | | | | 257/E23.021 |
| 7,688,586 | B2 * | 3/2010 | Tomioka | G06F 1/203 |
| | | | | 165/121 |
| 7,859,104 | B2 * | 12/2010 | Yao | H01L 23/373 |
| | | | | 257/706 |
| 9,562,301 | B2 * | 2/2017 | Plagemann | C09D 5/4476 |

* cited by examiner

THERMAL BRIDGE ELEMENT AND METHOD FOR THE PRODUCTION THEROF

CROSS-REFERENCE TO RELATED APPLICATIONS

The present application claims priority under 35 U.S.C. § 119 to German application number 10 2014 000 908.4, filed Jan. 28, 2014, the entire content of which is herein expressly incorporated by reference.

BACKGROUND AND SUMMARY OF THE INVENTION

Exemplary embodiments of the invention relate to a thermal bridge element, particularly for a space flight instrument, a satellite, a means of transportation, or a machine component, and to a method for producing the same.

Thermal bridge elements are used for the thermal coupling of two components for heat transfer. Frequently, the bridge elements have a flexible design to allow a relative movement of the components connected to each other by the bridge element.

Heat transport by means of solids is of particular importance in space flight applications, like a space flight instrument or a satellite, for example, because due to the absent medium air, the heat transport can primarily take place by means of solids, radiation, or multi-phase systems. In the field of transportation means, such as vehicles, for example, or in machine construction, such requirements are also found.

As a rule, flexible, thermal bridge elements are realized from metals, like, for example, copper or aluminum. For this purpose, multi-layered strips of metal foils can be produced and interconnected, for example, in order to be able to provide flexibility about an axis. At the same time, a sufficiently large cross-sectional surface is provided to ensure the heat transport by way of such a bridge element. The advantage of such connections is the simple processability of metals. The disadvantage is a relatively high specific weight in relation to conductivity. While copper has higher heat conductivity as compared to aluminum, the density is greater at the same time. A higher weight resulting therefrom is of disadvantage, particularly in space flight applications.

Furthermore, thermally highly conductive carbon fibers are known, the guide values of which in the fiber direction are, in relation to their thermal conductivity, three to four times as high as aluminum. Such fibers can transport more heat at significantly less weight. However, the production of a thermal, flexible bridge element is difficult due to the brittleness of the individual carbon fibers. For example, a strong clamping of the brittle carbon fibers, which is necessary for good heat transfer between the bridge element and the components coupled to the bridge element, results in substantial damage to at least some carbon fibers so that they can no longer contribute to heat conduction. Because impurities can also materialize from damage to carbon fibers, which are particularly problematic in space flight applications, bridge elements consisting of carbon fibers have not yet reached production line status.

Exemplary embodiments of the present invention are directed to a thermal bridge element, the weight-specific heat conductivity of which is significantly higher than in a component made of conventional materials. Furthermore, a method for producing such a thermal bridge element is to be disclosed.

In accordance with exemplary embodiments of the present invention a thermal bridge element is provided, in particular for use in a space flight instrument, a satellite, a transportation means (a motor vehicle, for example), or a machine component. The bridge element comprises a number of carbon fiber-reinforced plastic layers (thereafter: CFK layers), wherein each of the CFK layers is composed of a plurality of heat-conductive carbon fibers embedded in a matrix. On at least two segments, in particular opposing end segments, the CFK layers are freed of the material of the matrix so that the carbon fibers of a respective CFK layer in the at least two segments are exposed. The exposed segments of the carbon fibers are provided with an associated metallization, by way of which the bridge element is connected to a thermally conductive connector element.

A resin of minimum rigidity and high heat conductivity can be used for the matrix material. For example, doped resin systems with carbon modifications such as carbon nanotubes, graphite or graphene, are suitable. The CFK layers are plate-shaped or film-shaped, for example.

A thermal bridge element such as this has high heat conductivity, with low density and mechanical flexibility of the component at the same time. By embedding the carbon fibers in a matrix material, no impurities can materialize due to a breakage of some of the carbon fibers. As a result of the metallization and the heat-conductive connector elements, which in particular are made of a conventional metal, an essentially loss-free input or discharge of heat into or from the thermal bridge element, and more precisely, into or onto the carbon fibers of the CFK layers can take place. By metallization of the exposed segments of the carbon fibers, a good heat-conductive connection to a respective thermally conductive connector element is possible.

According to an advantageous embodiment, the exposed segments of the carbon fibers are end segments of the carbon fibers. The carbon fibers thereby extend unidirectionally, in a direction from a first of the end segments to a second of the end segments. Ideally, the plate-like or film-like elements have a thickness of 0.15 mm. The result thereof, apart from the good heat conductivity of the bridge element, is also a high flexibility of the bridge element about the axis transversely to the direction of the fibers.

According to a further embodiment, the thickness of the exposed segments in each CFK layer is between 50% and 70%, in particular about 60%, of the thickness of a non-exposed segment of the respective CFK layer.

According to a further embodiment, the fiber volume content of a non-exposed segment of a respective CFK layer is between 50% and 70%, in particular about 60%. This means that in the area of the exposed segments, the bridge element is entirely, or almost entirely, free of the material of the matrix.

According to a further practical embodiment, the metallization on the exposed segments has a thickness of about 5 μm to 20 μm. By providing metallization on the exposed segments, a good heat connection to the respective connector elements can be achieved.

According to a beneficial embodiment, the metallization is formed of copper. In principle, however, other metal materials, for example, gold, silver, and alloys thereof, are also feasible.

In order to achieve a particularly good thermal transition between the metallization and the carbon fibers of the CFK layer(s), the metallization can encompass the individual carbon fibers in the exposed segments. A further improved heat transition comes about due to the fact that the carbon fibers surrounded by the metallization are connected to each other in a material-fit manner, at least in one CFK layer. In particular, in the area of the end segments, the entire layer packet can be thermally conductively connected to one another in a material-fit manner.

It is expedient for a further optimized heat introduction into the carbon fibers, if the metallization borders on end faces of the carbon fibers that are freed of the matrix.

It is preferred that in fiber direction, the carbon fibers have high heat conductivity. For example, a carbon fiber material manufactured by Mitsubishi known under the name K13D2U, which with about 800 W/mK has one of the highest heat conductivities of a carbon fiber on the global market, can be used.

Furthermore, each of the connector elements can be connected in a material-fit manner to the associated metallized segments. With this embodiment, a particularly good heat transfer from the connector elements onto the metallized, exposed carbon fibers occurs. In the case of a purely force-fit connection, in particular by means of clamping, the connector elements can be detached from the layer packets provided with metallization without causing damage.

Furthermore, a method for producing a thermal bridge element of the type as described above is proposed, the method comprising the following steps:
a) Providing a number of CFK layers, wherein each of the CFK layers is composed of a plurality of heat-conductive carbon fibers embedded in a matrix;
b) removing the material of the matrix in at least two segments, particularly opposing end segments, of each of the number of CFK layers so that in the segments, the carbon fibers of a respective CFK layer are exposed;
c) metallizing the exposed segments;
d) stacking the segments of the number of CFK layers provided with a metallization into a layer packet, and establishing in a material-fit manner a connection of the metallized segments of at least some of the number of CFK layers;
e) connecting the metallized segments to an associated thermally conductive connector element.

The steps b), c), and d) in particular do not need to be carried out in the order specified (b-c-d), but can also be carried out in an order deviating therefrom. For example, steps c) and d) can be transposed with respect to their sequence. Likewise, step d), according to which the stacking of the number of CFK layers into a layer packet takes place, can be carried out prior to step b).

Optionally, the removal of the material of the matrix according to step b) can be done by chemical dissolution of by thermal dissolution. For chemical dissolution, a hydrochloric acid solution can be used, for example, in order to free the specified segments, in particular end segments, of a respective CFK layer from the matrix material. A thermal dissolution can be done by means of laser, for example.

According to an advantageous embodiment, the metallization of the exposed segments according to step c) can be done by galvanization, particularly with copper.

It is beneficial if the material-fit connection according to step d) is established by soldering. This reliably connects the metallized segments of the carbon fibers of a respective layer, as well as different CFK layers, to one another. Moreover, by controlling the quantity of the applied or introduced solder, a secure heat transfer to the thermally conductive connector element as a result of the greatly enlarged contact surface or the thermally active volume can be ensured.

According to a further embodiment of the method, the connector element preferably made of metal is connected to the associated metallized end segment by means of material fit, particularly by soldering; possibly in combination with a connection by force fit. Due to the fact that the force fit is done to a solder having ductile properties, the threat of damage to the carbon fibers as a result of the force introduced by the connector element is greatly reduced or even totally eliminated.

According to a further beneficial embodiment, the generating of the number of CFK layers with a unidirectional orientation of the fibers of the carbon fibers, and the impregnation with a material of the matrix is preferably done using the fiber winding method with a winding tool.

BRIEF DESCRIPTION OF THE DRAWING FIGURES

The invention is explained in more detail with reference to a drawing of an exemplary embodiment.

DETAILED DESCRIPTION

Figure 1:
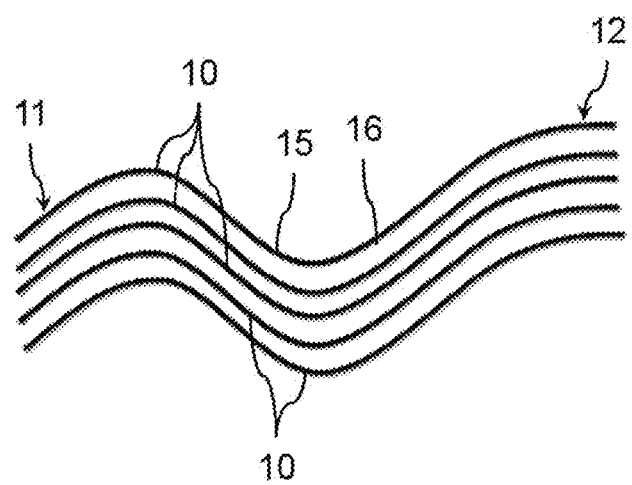
FIGS. 1 to 5 show sequential production steps for producing a flexible, thermal bridge element according to the invention.

It is necessary in the thermal layout of space flight components, like space flight instruments or satellites, for example, to provide thermal connections, which allow the heat flow between various points of the space flight component. This avoids overheating or undercooling of structure and individual components. At present, such thermal connections are made with solid or flexible component elements of conventional highly heat-conductive materials, like aluminum or copper. Copper has a heat conductivity that is more than twice as high as that of aluminum, however, the density of copper is more than three times the density of aluminum. All in all, there is a somewhat better ratio of density to heat conductivity for aluminum ($p/\alpha_{alu}=17.3$ kgK/Wm$^2$ and $p/\alpha_{copper}=22.2$ kgK/Wm$^2$).

Flexible thermal bridge elements are produced as multi-layered strips of metal foil, for example. They are flexible about an axis and have a sufficiently large cross-sectional surface in order to ensure the heat transport by the bridge element. The advantage of such bridge elements is in the simple processability. A disadvantage is the relatively high specific weight high specific weight in relation to the conductivity.

With the aid of the following figures, the production of a flexible, thermal bridge element 1 according to the invention as compared to traditional bridge elements of higher weight-specific heat conductivity is described. The bridge element 1 is pliable at the same time so that it can be easily used for heat transport in space flight applications, for example, in space flight instruments or satellites. The heat exchange between two components, which are connected to one another by way of one or several bridge elements 1, can be realized in a relatively loss-free manner therewith.

The structure of the bridge element 1 is based on the consideration that the heat conductivity of a carbon fiber-reinforced composite material is several times greater than that of copper or aluminum. At the same time, however, the weight of CFK as compared to metals is considerably lower.

The proposed bridge element 1 according to the invention utilizes thermally highly conductive carbon fibers, the conductance values of which in fiber direction is three to four times as high as that of aluminum. Thus, bridge elements having low mass, high form stability, good thermal conductance, and versatile application possibilities can be provided. Such a bridge element can be used not only in space flight components but in general in all such instruments, where high form stability is in the foreground, like in telescope structures, optical benches, waveguides, antenna reflectors and antenna structures etc., for example.

The production of the bridge element 1 is as follows. Initially, a number of CFK layers 10 is provided. Each of the CFK layers 10 is composed of a plurality of heat-conductive carbon fibers 15 embedded in a matrix material 16. Suitable carbon fibers are, for example, the carbon fibers manufactured by Mitsubishi known under the name K13D2U. They have a thermal conductivity in fiber direction of about 800 W/mK. Fibers known under the name K1100 could be used as an alternative, which have a significantly higher conductivity of 1100 W/mK but are no longer produced, and are thus no longer available on the global market. As a material for the matrix, a resin having low rigidity and high thermal conductivity can be used. Doped resin systems with carbon modifications, such as carbon nanotubes, graphite or graphene, are suitable, for example.

In each of the CFK layers 10, the carbon fibers 15 are unidirectional, that is, they are oriented in one direction. A CFK layer is generated by impregnation with a material of the matrix using the fiber winding method with a plate tool. To this end, in the framework of the production process, a carbon fiber roving can be wound onto a core. The impregnation of the roving is carried out by means of resin application on the tool. Upon winding, the rovings are pressed onto the tool core by means of a tool cover. A defined layer thickness or a defined fiber volume content can be adjusted via distance pieces.

A respective CFK layer has a dimension of 100×150 mm at a thickness of ideally less than 0.15 mm, for example.

By minimizing the number of fibers in the thickness direction of a respective plate, a higher flexibility about the axis crossways to the fiber direction can be achieved. This can also be accomplished by spreading the fiber roving within the framework of processing. An alteration of the fiber angle to the heat flow direction also results in a reduction of the flexural rigidity about the transverse axis to the heat flow direction. A combination of these approaches is possible.

As can be seen in FIG. 1, in the exemplary embodiment, a total of five CFK layers 10 are arranged on top of one another. In FIG. 1 as well as in all other figures, the carbon fibers 15 of a respective CFK layer 10 extend from one first end segment 11 to a second end segment 12. For illustration purposes only, the existing flexibility of the layer packet or layer stack crossways to the fiber direction is visualized by the wave-shaped progression in the plane of the drawing.

Figure 2:
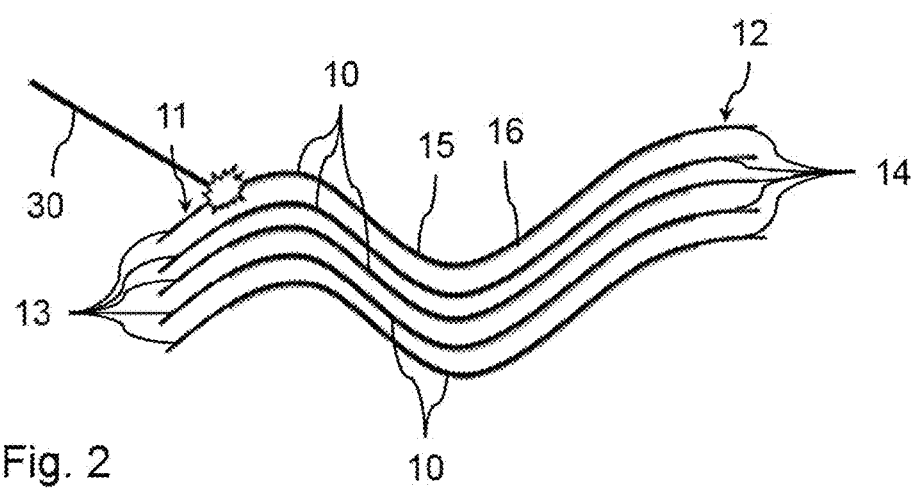
Figure 3:
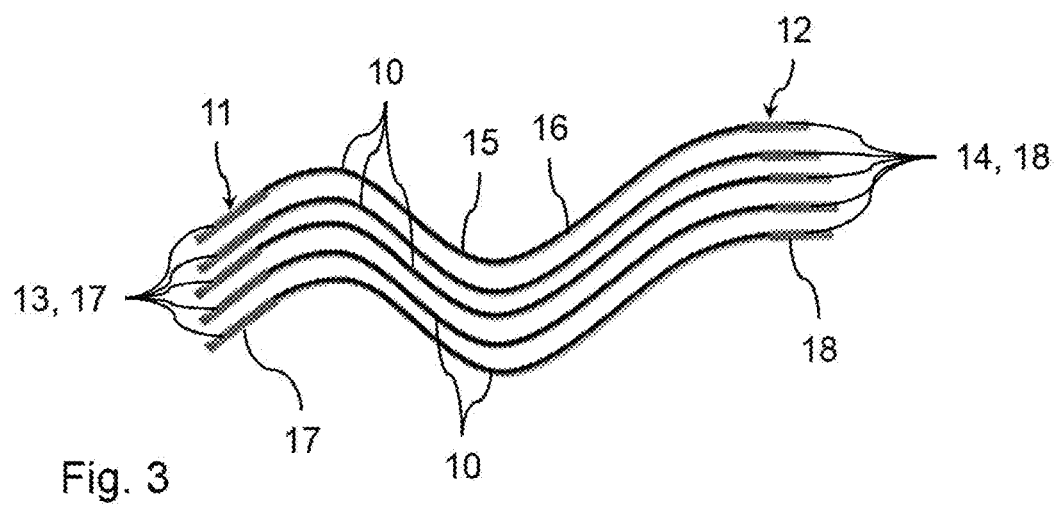

In a subsequent processing step, which is illustrated in FIG. 2, the respective end segments 11, 12 of all CFK layers 10 are freed of the material of the matrix 16 so that the carbon fibers 15 of a respective CFK layer are exposed in these segments 13, 14. The exposing of the fiber ends from the matrix can be done by means of chemical dissolution (for example, by means of hydrochloric acid solution) or thermal release by means of laser beam. After removal of the matrix material, about 60% of the layer thickness remains, at about a fiber volume content of the untreated CFK layer 10 of likewise 60%. It was found in trials that no damage to the carbon fibers occurs both during chemical and during thermal release of the matrix material. In FIG. 3, the release of the matrix material 16 is schematically indicated by a laser beam 30 of the uppermost CFK layer 10.

Contrary to the preceding description, the exposure of the fiber ends of the carbon fibers of a respective CFK layer could also be done prior to the stacking of the plurality of CFK layers 10. In other words, the processing steps illustrated in FIGS. 1 and 2 could also be carried out in reversed sequence.

Figure 4:
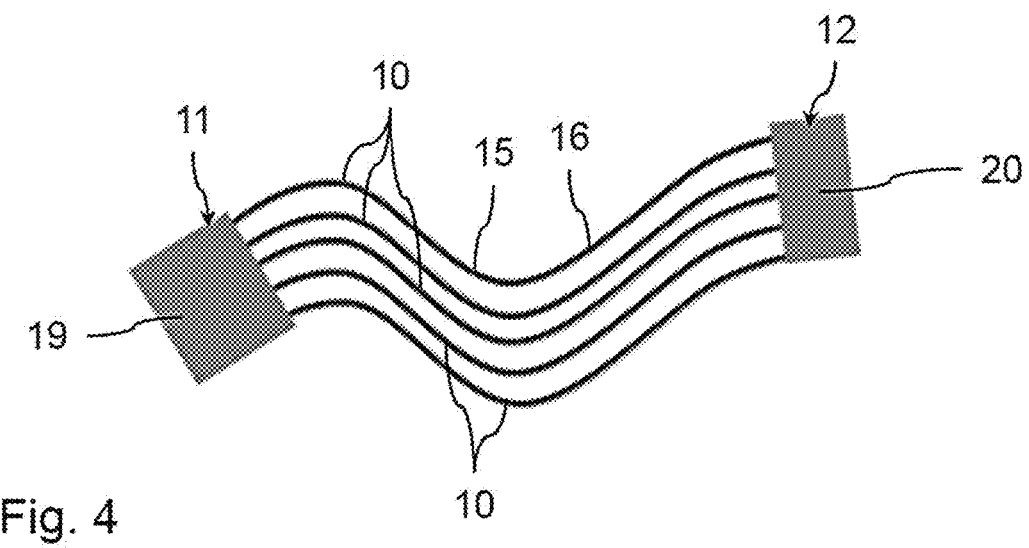
Figure 5:
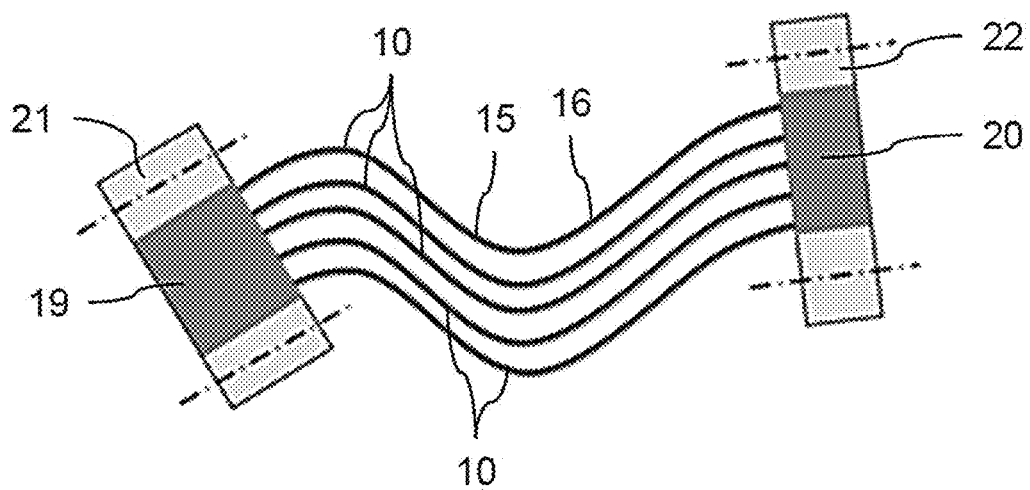

In a subsequent step (FIG. 3), a metallizing of the exposed end segments 13, 14 takes place. To this end, a galvanic copper plating of the exposed end segments 13, 14 of the carbon fibers 15 is carried out to start with. It is sufficient if the layer thickness achieved hereby is up to about 20 μm. During galvanizing, the end faces of the carbon fibers 15 in particular are covered with the metal layer. Thereafter, a soldering of the pre-metallized fiber ends is carried out. In a first intermediate step, the metallized carbon fiber ends of a respective CFK layer 10 can thereby be thermally connected to one another to start with. It is expedient if the soldering of the metallized ends of the carbon fibers is carried out across several CFK layers 10. The result thereof is the thermal connection 19 or 20 to the opposing end segments 11, 12 of the layer packet, as illustrated in FIG. 4.

Finally, in a last processing step, a respective metal, thus highly heat-conductive, connector element 21, 22, is connected to the thermal connections 19, 20 generated as described above, by material fit, or optionally, in combination with force fit. The connector elements 21, 22 can be connected to the associated thermal connection 19, 20 by soldering, optionally in combination with clamping, for example. By way of the connector elements 21, 22, a connection to the components to be coupled to one another thermally and/or mechanically, for example, of a space flight instrument, is to be carried out.

A bridge element 1 produced in this way has high performance capability to low density at mechanical flexibility of the component. This is realized by using carbon fibers having a high thermal transfer capability. A contamination problem due to fiber break during production is minimized or eliminated by embedding the carbon fibers in a matrix material. Due to the fact that the face ends of the carbon fibers are in contact with the metallization, a loss-free entry or discharge of heat into or from the fiber ends is made possible.

Figure 6:
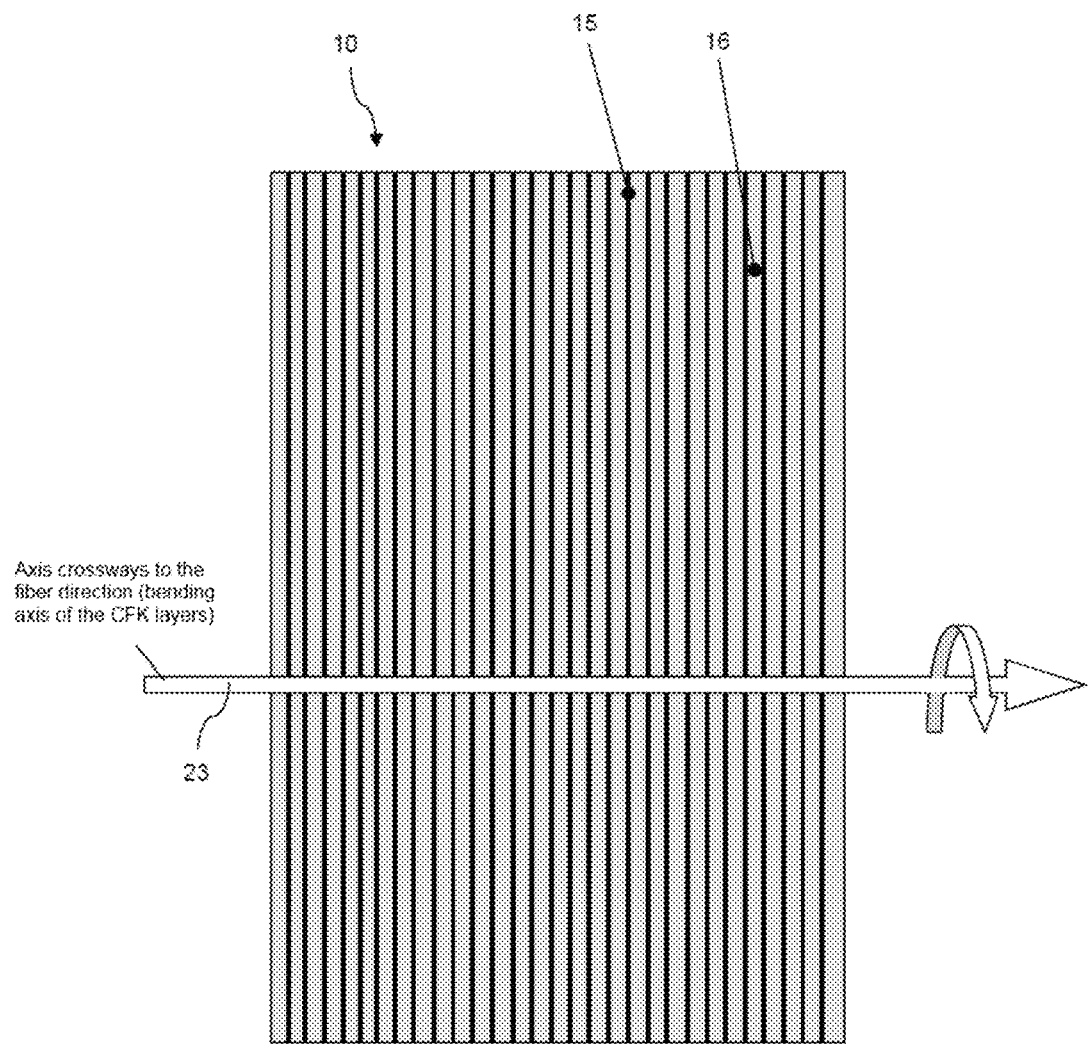
FIG. 6 shows a top view onto a CFK film or CFK plate, which is used for producing a bridge element according to the invention.

FIG. 6 shows a top view of one of the CFK layers 10 in the form of a foil or a plate, from which the unidirectional progression of the carbon fibers 15 in the matrix 16 can be discerned. In addition, the bending axis (reference numeral 23) is illustrated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS 1 bridge element
10 CFK layer
11 first (end) segment of CFK layer 10
12 second (end) segment of CFK layer 10
13 first, exposed end segment of CFK layer 10
14 second, exposed end segment of CFK layer 10

15 carbon fibers
16 matrix
17 metallization of the first end segment 13 exposed from the matrix
18 metallization of the second end segment 14 exposed from the matrix
19 thermal connection
20 thermal connection
21 first connector element
22 second connector element
23 bending axis
30 laser beam

What is claimed is:

1. A flexible thermal bridge element for a space flight instrument, a satellite, a transportation means, or a machine component, the thermal bridge element comprising:
   a number of carbon fiber-reinforced plastic (CFK) layers stacked on top of one another, wherein each of the CFK layers is composed of a plurality of heat-conductive carbon fibers embedded in a matrix,
   wherein in at least two segments the CFK layers are freed of the material of the matrix so that the carbon fibers of a respective CFK layer are exposed in the at least two segments, wherein the at least two segments are opposing end segments of the respective CFK layers, thereby forming exposed end segments,
   wherein the exposed end segments of the carbon fibers include an associated metallization, by way of which the bridge element is connected to a thermally conductive connector element,
   wherein the metallization encompasses the individual carbon fibers in the exposed end segments, and
   wherein the exposed end segments freed from the material of the matrix and the carbon fibers surrounded by the metallization of each CFK layer are connected to one another in a material-fit manner,
   wherein the CFK layers are plate-shaped or film-shaped and have a thickness of less than 0.15 mm.

2. The flexible thermal bridge element of claim 1, wherein the exposed end segments of the carbon fibers are end segments of the plurality of heat-conductive carbon fibers, wherein the plurality of heat-conductive carbon fibers extend unidirectionally, in a direction from a first of the end segments to a second of the end segments.

3. The flexible thermal bridge element of claim 1, wherein a thickness of the exposed end segments of a respective CFK layer is between 50% and 70%, of a thickness of a non-exposed segment of the respective CFK layer.

4. The flexible thermal bridge element of claim 1, wherein a fiber volume content of a non-exposed segment of a respective CFK layer is between 50% and 70%.

5. The flexible thermal bridge element of claim 1, wherein the metallization on the exposed end segments has a thickness of about 5 µm to 20 µm.

6. The flexible thermal bridge element of claim 1, wherein the metallization is formed of copper.

7. The flexible thermal bridge element of claim 1, wherein the metallization borders on end faces of the carbon fibers that are freed of the matrix.

8. The flexible thermal bridge element of claim 1, wherein in fiber direction, the carbon fibers have a heat conductivity of at least about 800 W/mK.

9. The flexible thermal bridge element of claim 1, wherein the connector elements are each connected to the associated metallized segments in a material-fit manner, by soldering and in combination with a clamping force-fit connection.

* * * * *